Figure 1:
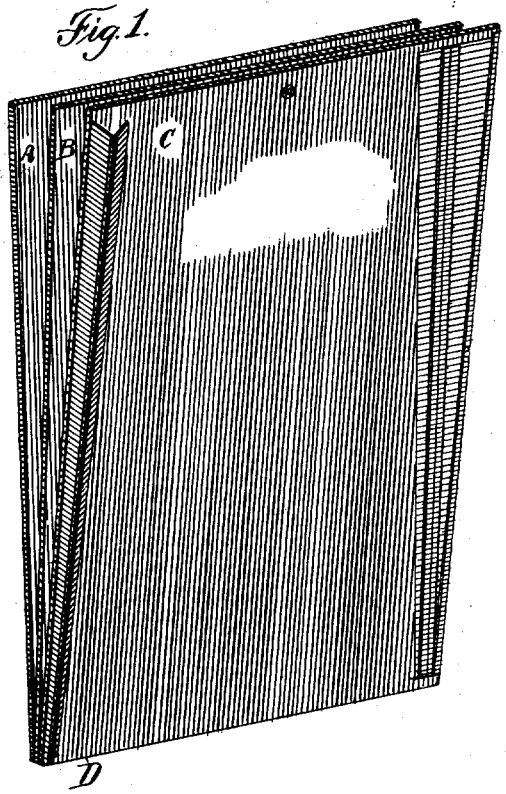

2 Sheets—Sheet 1.

J. T. WHITE.

Assignor to F. D. WHITE.

ANATOMICAL CHART.

No. 10,790. Reissued Dec. 14, 1886.

Witnesses:
C. H. H. Brown
Frank Brawner.

Inventor:
James T. White.
By Wallace A. Barlett
His attorney

N. PETERS, Photo-Lithographer, Washington, D. C.

2 Sheets—Sheet 2.

J. T. WHITE.

Assignor to F. D. WHITE.

ANATOMICAL CHART.

No. 10,790. Reissued Dec. 14, 1886.

Witnesses:
C. W. H. Brown.
Frank Brawner.

Inventor.
James T. White
By Wallace A. Barlett
His attorney.

N. PETERS, Photo-Lithographer, Washington, D. C.

UNITED STATES PATENT OFFICE.

JAMES T. WHITE, OF SAN FRANCISCO, CALIFORNIA, ASSIGNOR TO FLORENCE D. WHITE, OF SAME PLACE.

ANATOMICAL CHART.

SPECIFICATION forming part of Reissued Letters Patent No. 10,790, dated December 14, 1886.

Original No. 342,154, dated May 18, 1886. Application f r reissue filed October 27, 1886. Serial No. 217,355.

*To all whom it may concern:*

Be it known that I, JAMES T. WHITE, of San Francisco, in the county of San Francisco and State of California, have invented certain new and useful Improvements in Anatomical Charts; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to anatomical charts; and it consists in providing a full-sized folding chart of portable construction which is adapted to the use of school-teachers and lecturers, as well as for private families. It fully answers the purpose of the most costly chart, while it is far more portable and durable when exposed to careless handling. It may be constructed of pasteboard, bristol-board, papier-maché, or other suitable material for presenting plain or embossed representations of the form and structure of the different organs of the human body, the whole, when folded, being contained in a convenient-sized portfolio to carry in the hand. It is constructed to hang against the wall, the upper section being formed of a single sheet or card, the lower half or section being formed of any convenient number of cards or leaves, to furnish additional charts composed of enlarged or microscopic sections or other representations of the different organs of the body.

I am aware that books and other publications have been issued to the public setting forth the human organism in a concise and complete manner, with a full description of the uses of the different organs; and I have not attempted to present any new discovery in anatomical or physiological science; but my object is to present a new and valuable article of manufacture, which will supply a much felt want, of an inexpensive and portable and ready means of teaching anatomy and physiology in schools and colleges and in private families.

My invention will be more clearly understood by reference to the accompanying drawings and the letters referring thereto.

Figure 3:
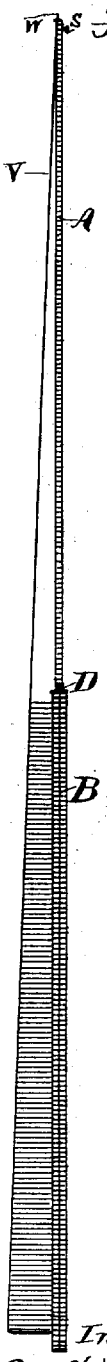
Figure 4:
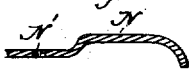
Figure 2:
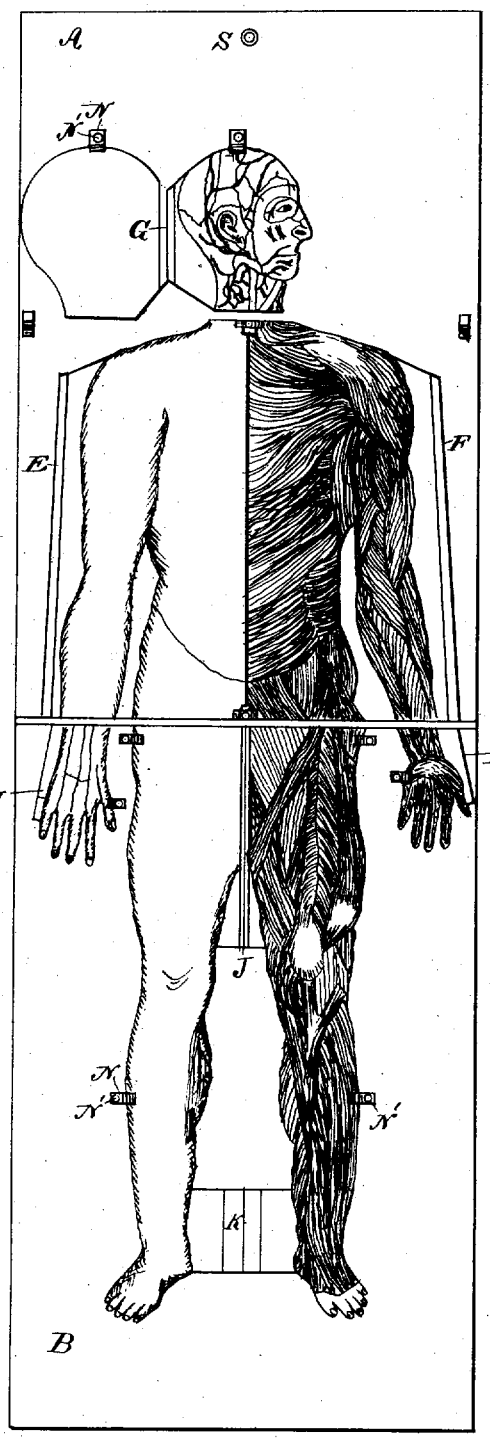

Figure 1 is a perspective view of my improved chart folded in the form of a portfolio, showing an extra leaf or card, which may be utilized as a chart, the back piece, V, being removed. Fig. 2 shows the same opened or with the lower portion let down, revealing the whole human form, with one leaf thrown back or open to show a portion of the head with the venous or muscular structure, and the skin removed from the left side of the body or trunk and the left arm and leg, to show the arrangement of the muscles. Fig. 3 is a side elevation of the chart, and Fig. 4 is an enlarged detail view of one of the spring-catches.

The following is the construction of my improved chart: I construct the upper and lower sections of equal length, so that when folded, as shown in Fig. 1, the legs, which are wholly contained upon the lower section, are folded up against the trunk or body, thus placing the whole in a convenient portable form as a portfolio.

A represents the upper section, which contains the body; B, the lower section, which contains the legs; and C represents an extra section, to serve as one outside cover or leaf to afford space for such explanatory charts as may be required, as when microscopic views are shown in explanation of the functions of the organs of the body.

The sections A B are connected at their inner ends by a flexible hinge, D, and the section C is also connected with said hinge, as shown in Fig. 3. The section C is normally hid from view by the section B, and forms an auxiliary section adapted to contain any desired explanatory matter, and when in use the section B is raised to expose it and is supported in any suitable manner.

I form the hinge D of linen or such other material as is employed in the construction of the hinges of strong and durable book-covers, and the hinges E, F, G, H, I, J, and K are of similar construction, and secured in the manner of other well-known construction where such hinges are employed.

I employ the catches N for holding the leaves in place when they are opened out. I generally form the catches N of thin sheet-brass or other thin tough metal, to allow the leaves to be sprung under and caught or held down as each successive leaf is being examined. The same device is employed to hold the leaves in position when closed up for placing away, or to keep them firmly in position for transporting.

The catches N are, as shown in Fig. 2, secured by pins N′ at one end to the chart, and are open at their other ends, so that the edges of the leaves of the chart may be passed under their free ends.

I generally employ the eyelets S for the purpose of hanging the chart upon a hook or nail to explain the same. The following is the operation of the same: When employed by teachers for illustrating and explaining anatomy and physiology, the eyelet S is hooked upon a nail or hook against the wall, or any suitable easel or frame, to support it in the required upright position.

V represents a brace or back piece, thicker at its lower than at its upper end, and hinged to the section A at its upper end by a hinge, W. This back piece has a plain or straight rear face to set flat against the wall, while its inner face tapers from its lower to its upper end, thus causing the leaves to lie closely against the chart.

I claim—

1. An anatomical chart having a series of leaves representing various parts of the system, said leaves hinged to overlie each other and to fold back, and a series of catches applied to the cover and overlapping the edges of said leaves to hold them in place, substantially as described.

2. The combination, with a back piece thicker at its lower than at its upper end and having the tapering or slanting inner face, of the chart comprising the hinged sections A B C, the sections A B having a series of hinged leaves with representations of different parts of the human system thereon, the section C having any desired explanatory matter thereon, and spring catches for holding the leaves in an open position, substantially as set forth.

3. A folding anatomical chart consisting of two sections, each of said two sections being provided with a series of hinged leaves representing various parts of the system and overlying each other, while the two sections can be folded compactly together, for the purposes described.

4. An anatomical chart hinged in the middle, the hinged portion having a base sheet representing the legs of the human body, said sheet provided with a hinge through its center, thereby allowing the said limbs to open alternately one over the other.

In testimony whereof I affix my signature in presence of two witnesses.

JAMES T. WHITE.

Witnesses:
W. D. KEOR,
H. E. PARRY.